(12) United States Patent
Moritomo

(10) Patent No.: US 11,353,941 B2
(45) Date of Patent: Jun. 7, 2022

(54) DEVICE AND METHOD FOR AUTHENTICATING A DEVICE FOR POWER DELIVERY

(71) Applicant: CANON KABUSHIKI KAISHA, Tokyo (JP)

(72) Inventor: Hiroshi Moritomo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/238,959

(22) Filed: Jan. 3, 2019

(65) Prior Publication Data

US 2019/0212795 A1 Jul. 11, 2019

(30) Foreign Application Priority Data

Jan. 10, 2018 (JP) .............................. JP2018-001867

(51) Int. Cl.
 *G06F 1/26* (2006.01)
 *G06F 21/44* (2013.01)
 *G06F 13/10* (2006.01)

(52) U.S. Cl.
 CPC .............. *G06F 1/26* (2013.01); *G06F 21/44* (2013.01); *G06F 1/266* (2013.01); *G06F 13/10* (2013.01); *G06F 21/445* (2013.01)

(58) Field of Classification Search
 CPC ........... G06F 1/26; G06F 1/266; G06F 21/44; G06F 13/10; G06F 21/445
 USPC ................ 713/300; 710/8, 16; 726/2, 16, 34
 See application file for complete search history.

(56) References Cited

U.S. PATENT DOCUMENTS

| | | | | |
|---|---|---|---|---|
| 5,884,086 A | * | 3/1999 | Amoni | G06F 1/266 700/282 |
| 7,024,567 B2 | * | 4/2006 | Kim | G06F 1/266 713/300 |
| 8,332,664 B2 | * | 12/2012 | Farrar | G06F 1/266 713/300 |
| 2009/0273764 A1 | * | 11/2009 | D'Alessio | G06F 1/266 353/85 |

(Continued)

FOREIGN PATENT DOCUMENTS

| | | |
|---|---|---|
| JP | H01-093927 U | 6/1989 |
| JP | 2015-039248 A | 2/2015 |

(Continued)

OTHER PUBLICATIONS

Embedded Staff, "USB Type-C and power delivery 101—Power delivery protocol", May 15, 2017, downloaded from https://www.embedded.com/usb-type-c-and-power-delivery-101-power-delivery-protocol/ (Year: 2017).*

*Primary Examiner* — Ji H Bae
(74) *Attorney, Agent, or Firm* — Canon U.S.A., Inc. I.P. Division

(57) ABSTRACT

An electronic device includes a requesting unit that requests a power supply apparatus to supply power, and a determination unit that determines whether the power supply apparatus is an authentic apparatus. In a case in which the determination unit determines whether the power supply apparatus is the authentic apparatus, after the requesting unit has requested the power supply apparatus to supply first power and the determination unit determines that the power supply apparatus is the authentic apparatus, the requesting unit then requests the power supply apparatus to supply second power higher than the first power.

20 Claims, 9 Drawing Sheets

(56) References Cited

U.S. PATENT DOCUMENTS

| | | | | |
|---|---|---|---|---|
| 2015/0134893 A1* | 5/2015 | Anderson | ............ | G06F 3/0679 |
| | | | | 711/103 |
| 2017/0031403 A1* | 2/2017 | Waters | ................ | G06F 13/4282 |
| 2017/0054310 A1* | 2/2017 | Chen | ........................ | H02J 7/00 |
| 2017/0126029 A1 | 5/2017 | Moritomo | | |
| 2018/0004277 A1 | 1/2018 | Matsui et al. | | |
| 2018/0004279 A1 | 1/2018 | Matsui et al. | | |
| 2018/0019585 A1* | 1/2018 | Koga | ................... | H02H 11/005 |
| 2018/0183234 A1* | 6/2018 | Morii | ....................... | H02H 7/18 |
| 2019/0065422 A1* | 2/2019 | Sporck | ............... | G06F 13/4282 |
| 2019/0207379 A1* | 7/2019 | Moritomo | ........... | G06F 13/4295 |

FOREIGN PATENT DOCUMENTS

| | | |
|---|---|---|
| JP | 2017-085853 A | 5/2017 |
| JP | 2017-085854 A | 5/2017 |
| JP | 2018-007450 A | 1/2018 |
| JP | 2018-007451 A | 1/2018 |

* cited by examiner

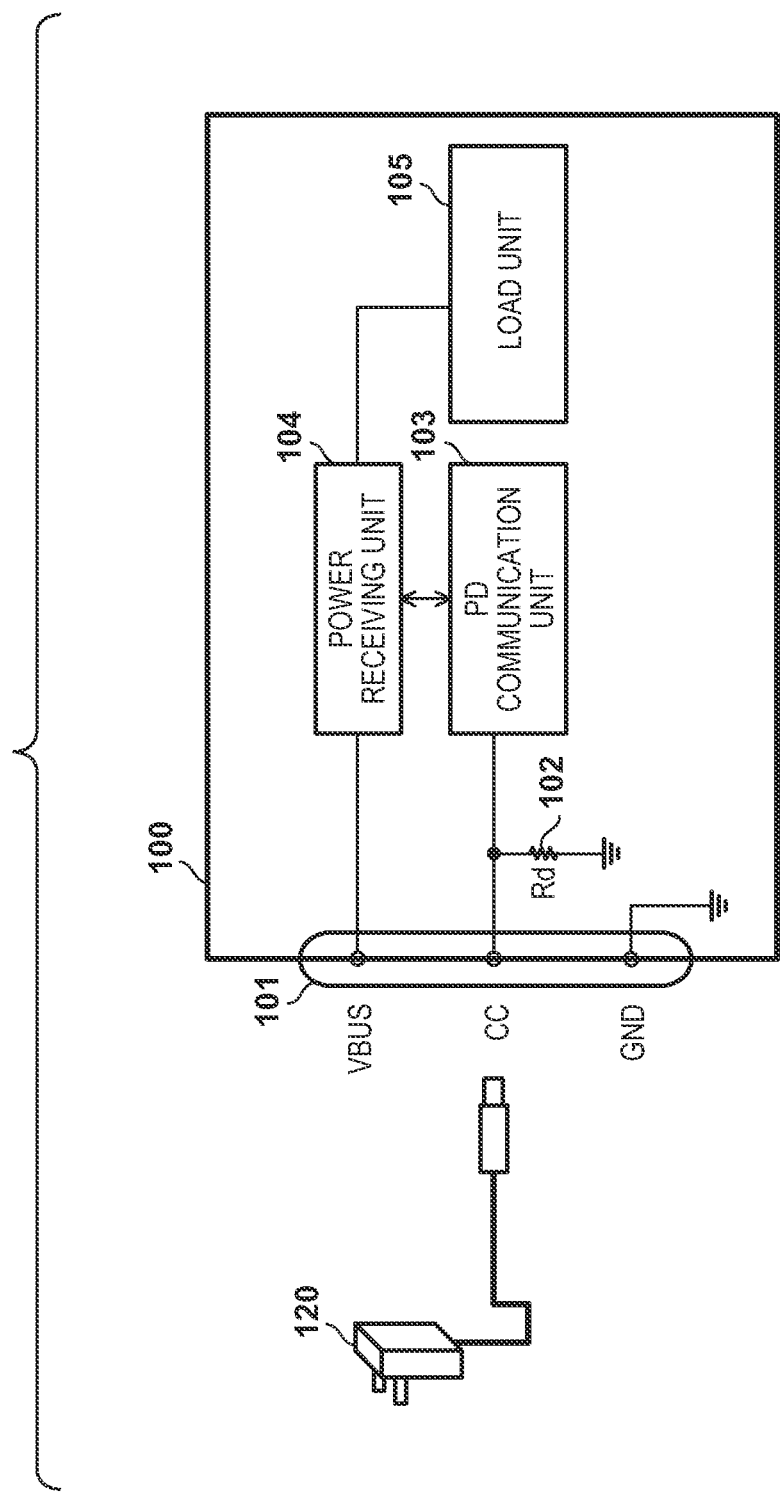

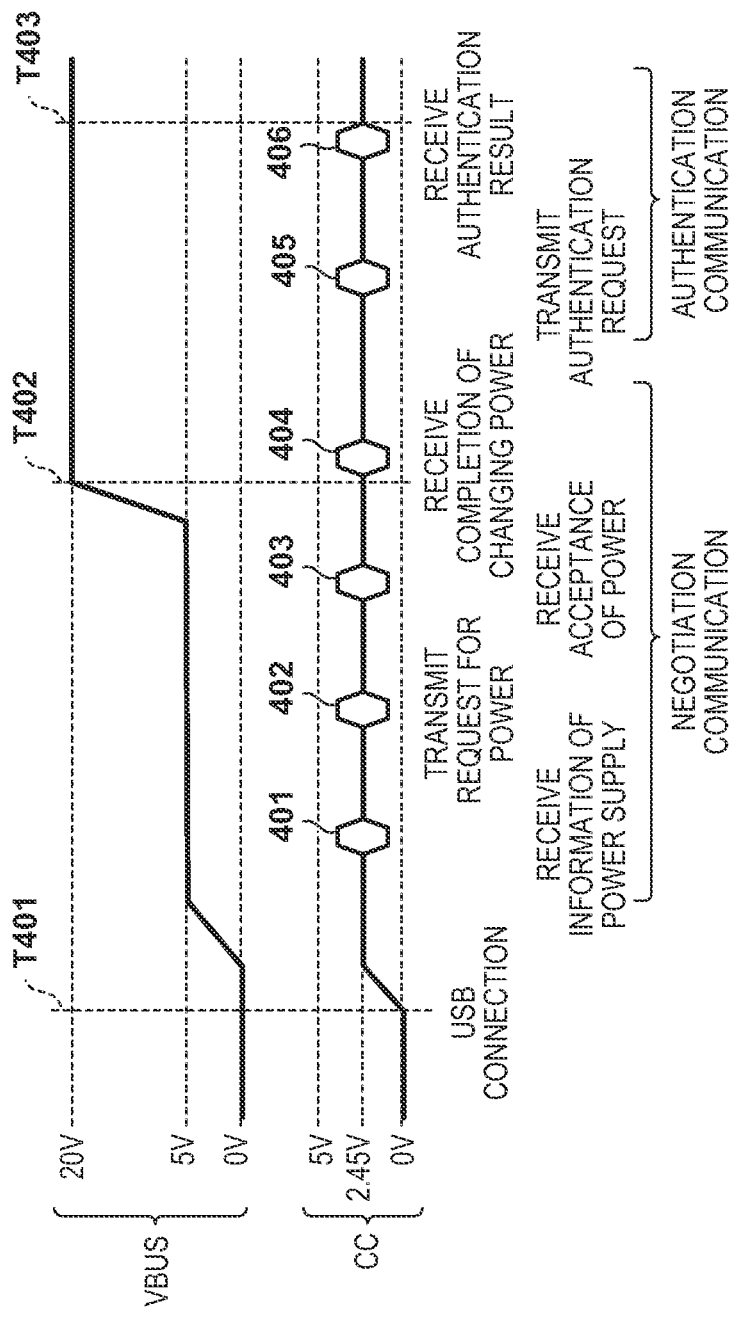

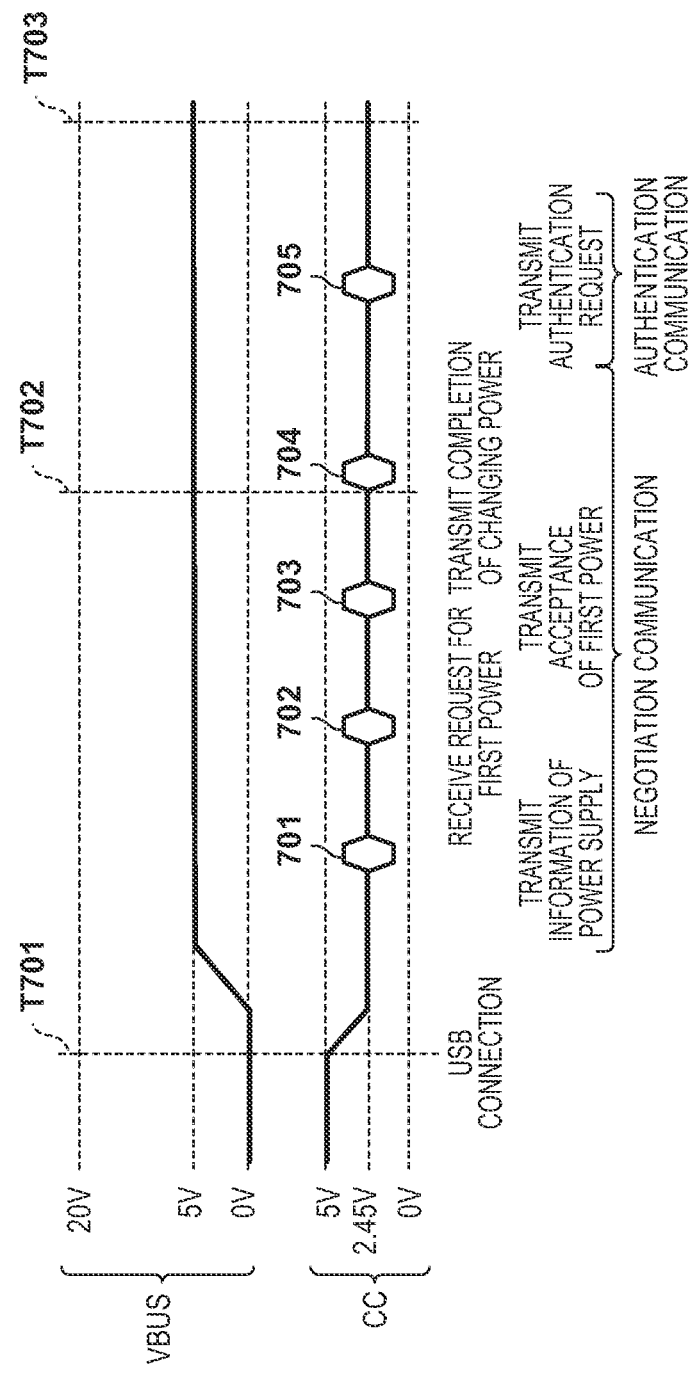

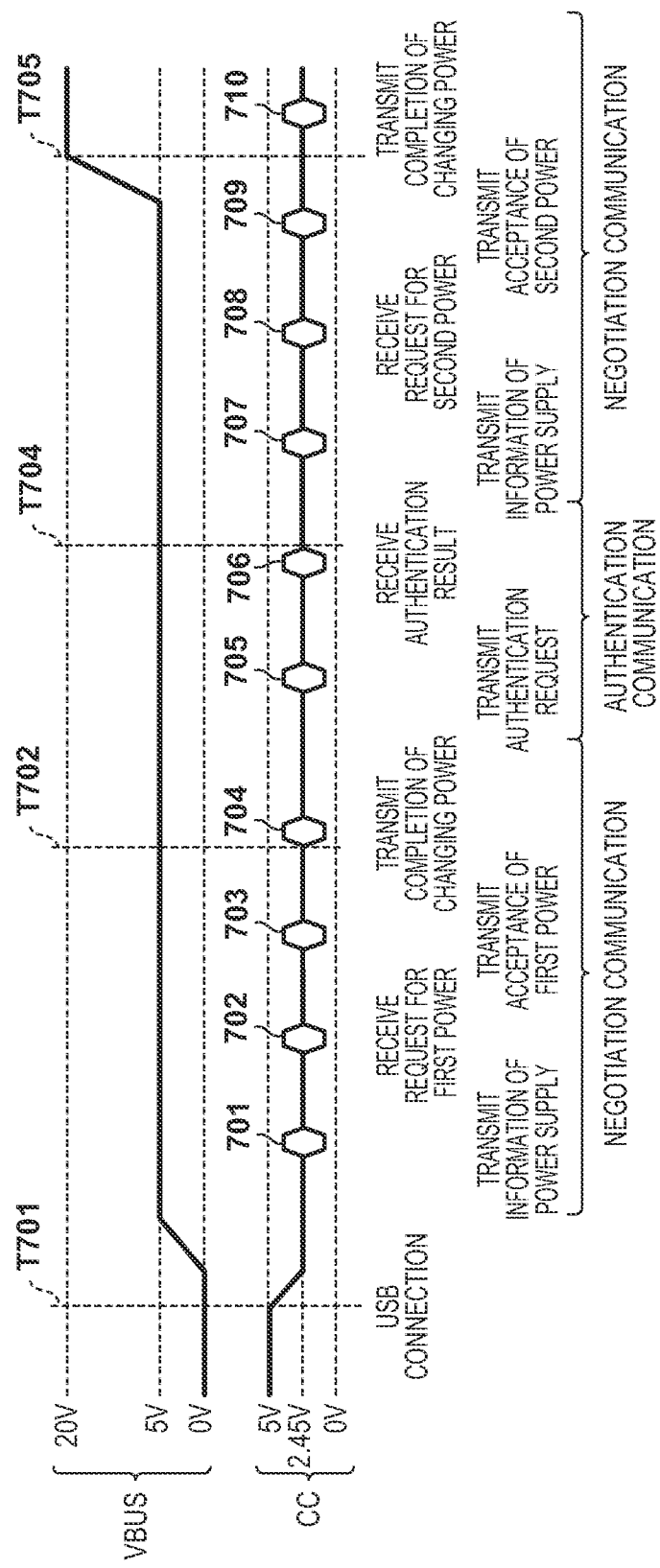

DEVICE AND METHOD FOR AUTHENTICATING A DEVICE FOR POWER DELIVERY

BACKGROUND

Field of the Invention

Aspects of the disclosure generally relate to an electronic device and a control method thereof.

Description of the Related Art

There is known an electronic device that includes an interface that can receive power and supply power in addition to executing data transfer (Japanese Patent Laid-Open No. 2015-39248). An example of such an interface is an USB (Universal Serial Bus). USB PD (Power Delivery) standard is specified as a standard related to the USB. According to the USB PD standard, a power supply apparatus such as a USB host controller or an AC adapter can supply power of up to 100 W to a power receiving apparatus via a USB cable. When a power supply apparatus and a power receiving apparatus conforming to the USB PD standard are connected to each other, power information is transmitted and received between the two apparatuses by power negotiation communication. Power is supplied from the power supply apparatus to the power receiving apparatus based on the result of such power negotiation.

However, even in a case in which a power supply apparatus includes an interface conforming to a predetermined standard, the power supply apparatus that includes the interface may not perform a power supply operation conforming to the predetermined standard. Therefore, a power receiving apparatus is required to allow, even in a case in which it is connected to such a power supply apparatus, the power to be safely supplied from the power supply apparatus to the power receiving apparatus.

SUMMARY

According to an aspect of the disclosure, there is provided an electronic device or a control method that is more improved than the electronic device or the control method described above.

According to an aspect of the disclosure, it is possible to allow power to be safely supplied from a power supply apparatus to a power receiving apparatus.

According to an aspect of the disclosure, there is provided an electronic device comprising: a requesting unit that requests a power supply apparatus to supply power; and a determination unit that determines whether the power supply apparatus is an authentic apparatus, wherein in a case in which the determination unit determines whether the power supply apparatus is the authentic apparatus, after the requesting unit has requested the power supply apparatus to supply first power and the determination unit determines that the power supply apparatus is the authentic apparatus, the requesting unit then requests the power supply apparatus to supply second power higher than the first power.

According to an aspect of the disclosure, there is provided an electronic device comprising: a informing unit that informs information indicating power that can be supplied to a power receiving apparatus; and a determination unit that determines whether the power receiving apparatus is an authentic apparatus, wherein in a case in which the determination unit determines whether the power receiving apparatus is the authentic apparatus, after the informing unit has informed information indicating first power to the power receiving apparatus and the determination unit determines that the power receiving apparatus is the authentic apparatus, the informing unit then informs information indicating second power higher than the first power to the power receiving apparatus.

According to an aspect of the disclosure, there is provided a method comprising: requesting a power supply apparatus to supply first power determining whether the power supply apparatus is an authentic apparatus after the requesting of the power supply apparatus to supply the first power, and requesting, in a case in which the power supply apparatus is determined to be the authentic apparatus, the power supply apparatus to supply second power higher than the first power.

According to an aspect of the disclosure, there is provided a method comprising: informing, to a power receiving apparatus, first power as power that can be supplied; determining whether the power receiving apparatus is an authentic apparatus after the informing, to the power receiving apparatus, the first power; and informing, to the power receiving apparatus, in a case in which the power receiving apparatus is determined to be the authentic apparatus, second power higher than the first power as the power that can be supplied.

According to an aspect of the disclosure, there is provided a non-transitory storage medium storing a program causing a computer to execute a method, the method comprising: requesting a power supply apparatus to supply first power; determining whether the power supply apparatus is an authentic apparatus after the requesting of the power supply apparatus to supply the first power; and requesting, in a case in which the power supply apparatus is determined to be the authentic apparatus, the power supply apparatus to supply second power higher than the first power.

According to an aspect of the disclosure, there is provided a non-transitory storage medium storing a program causing a computer to execute a method, the method comprising: informing, to a power receiving apparatus, first power as power that can be supplied; determining whether the power receiving apparatus is an authentic apparatus after the informing, to the power receiving apparatus, the first power, and informing, to the power receiving apparatus, in a case in which the power receiving apparatus is determined to be the authentic apparatus, second power higher than the first power as the power that can be supplied.

Further aspects of the embodiments will become apparent from the following embodiments.

BRIEF DESCRIPTION OF THE DRAWINGS

FIG. 1 is a block diagram for illustrating the arrangement of a power receiving apparatus 100 according to a first embodiment;

FIG. 4A is a timing chart for illustrating a comparison example that is to be compared with a timing chart shown in FIG. 4B;

FIG. 7A is a timing chart for illustrating an example of the operation of the power supply apparatus 120 according to the first embodiment; and FIG. 7B is a timing chart for illustrating another example of the operation of the power supply apparatus 120 according to the first embodiment.

DESCRIPTION OF THE EMBODIMENTS

Figure 2A:
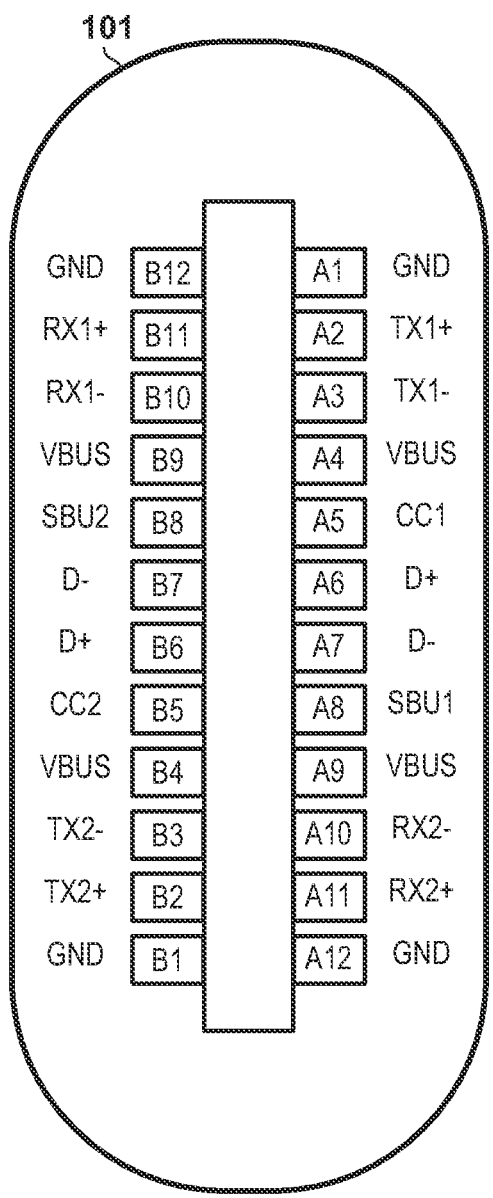
FIG. 2A is a view for illustrating a pin assignment of a connector 101.

Exemplary embodiments, features, and aspects of the disclosure will be described below with reference to the drawings. However, aspects of the disclosure are not limited to the following embodiments.

First Embodiment

<1. Power Receiving Apparatus>

The arrangement of a power receiving apparatus 100 according to the first embodiment will be described with reference to FIG. 1. FIG. 1 is a block diagram for illustrating the arrangement of the power receiving apparatus 100 according to the first embodiment.

A power supply apparatus 120 is an electronic device that supplies power to the power receiving apparatus 100 via a USB cable. Although a case in which the power supply apparatus 120 is an AC adapter (or an AC-USB adapter) that converts AC power into DC power will be exemplified in the first embodiment, the power supply apparatus 120 is not limited to such a device. For example, the power supply apparatus 120 may be a portable battery or the like. Note that components of the power supply apparatus 120 will be described later with reference to FIG. 5.

The power receiving apparatus 100 is an electronic device that receives power from the power supply apparatus 120 via a USB cable. Although a case in which the power receiving apparatus 100 is a digital camera will be exemplified in the first embodiment, the power receiving apparatus 100 is not limited to a digital camera.

As shown in FIG. 1, the power receiving apparatus 100 includes a connector 101, a pull-down resistor (Rd) 102, a PD communication unit 103, a power receiving unit 104, and a load unit 105. However, components of the power receiving apparatus 100 are not limited to components shown in FIG. 1.

The connector 101 is a receptacle conforming to USB Type-C standard. The connector 101 is connected to a connector (plug) conforming to the USB Type-C standard included in a USB cable connected to the power supply apparatus 120. The connector 101 has a pin assignment as shown in FIG. 2A. FIG. 2A is a view for illustrating the pin assignment of the connector 101. The connector 101 has a point-symmetric pin assignment so that it can operate normally even in a case in which it is inserted upside down. The connector 101 includes VBUS terminals to which power is supplied from the power supply apparatus 120 and CC (configuration channel) terminals for obtaining information related to the power supply capability from the power supply apparatus 120. The connector 101 also includes GND (ground) terminals that serve as signal references. TX terminals (TX1+, TX1−, TX2+, and TX2−) are signal transmitting terminals and RX terminals (RX1+, RX1−, RX2+, and RX2−) are signal receiving terminals, and these terminals can support high-speed data transfer operations. SBU terminals (SBU1 and SBU2) are sideband signal terminals and can be used appropriately for various kinds of purposes. A D+ terminal and a D− terminal are used to support USB 2.0 standard.

One end of the pull-down resistor 102 is connected to the CC terminal of the connector 101. The other end of the pull-down resistor 102 is connected to the GND terminal of the connector 101. The pull-down resistor 102 has a resistance value specified by the USB Type-C standard. The pull-down resistor 102 allows the power supply apparatus 120 to determine the connection of the power receiving apparatus 100. The pull-down resistor 102 also allows the power receiving apparatus 100 to determine the power supply capability of the power supply apparatus 120 based on a voltage value of the CC terminal.

The PD communication unit 103 is connected to the CC terminal of the connector 101. The PD communication unit 103 can execute communication based on USB PD standard as well as determine whether the connected power supply apparatus 120 conforms to the USB PD standard.

In a case in which the connected power supply apparatus 120 is capable of executing USB PD communication, the power receiving apparatus 100 performs, by the PD communication unit 103, negotiation communication based on a communication protocol specified by the USB PD standard, and makes a desired power supply request to the power supply apparatus 120. The power receiving apparatus 100 also performs, by the PD communication unit 103, communications for authentication based the communication protocol specified by the USB PD standard, and authenticates whether the power supply apparatus 120 is an apparatus conforming to the USB PD standard. Note that the fact that the power supply apparatus 120 is an authentic apparatus is synonymous with the fact that the power supply apparatus 120 is an apparatus conforming to the USB PD standard. In the first embodiment, assume that there are at least two types of power that can be requested from the PD communication unit 103 to the power supply apparatus 120. Assume that one type of power that can be requested from the PD communication unit 103 to the power supply apparatus 120 is minimum power necessary for the power receiving apparatus 100 to determine whether the power supply apparatus 120 conforms to the USB PD standard (authentication process). In this manner, the PD communication unit 103 can function as a requesting unit that requests the power supply apparatus 120 to supply power.

The power receiving unit 104 is connected to the VBUS terminal of the connector 101. The power receiving unit 104 supplies power necessary for each component of the power receiving apparatus 100 by using power supplied from the power supply apparatus 120 to the VBUS terminal. The power receiving unit 104 controls the power received from the power supply apparatus 120 based on an instruction from the PD communication unit 103. The GND terminal of the connector 101 is connected to a ground line of the power receiving apparatus 100.

The load unit 105 is formed by various kinds of modules (not shown). When the load unit 105 operates, power supplied from the power receiving unit 104 is consumed. The power consumed by the load unit 105 changes in accordance with the operation state of the power receiving apparatus 100. For example, as described above, assume that the power receiving apparatus 100 is, for example, a digital camera. In this case, the various kinds of modules forming the load unit 105 are an image sensing lens that zooms in and focuses on an object image, an image sensor that converts the object image into electrical image information, a display unit such as an LCD that displays the obtained image information, an operation unit that includes various kinds of switches, or the like.

An example of the operation of the power receiving apparatus 100 according to the first embodiment will be described next with reference to the flowchart of FIG. 3.

When the power supply apparatus 120 is connected to the connector 101 of the power receiving apparatus 100 via the USB cable, the PD communication unit 103 starts, in step S301, transmission/reception of information with the power supply apparatus 120 based on the communication protocol of the USB PD standard. The information transmitted/received between the power supply apparatus 120 and the power receiving apparatus 100 includes information related to power that can be supplied from the power supply apparatus 120 to the power receiving apparatus 100.

In step S302, the PD communication unit 103 determines, based on predetermined negotiation communication, whether the power supply apparatus 120 conforms to the USB PD standard. For example, the PD communication unit 103 determines whether the power supply apparatus 120 conforms to the USB PD standard in accordance with whether predetermined information based on the communication protocol of the USB PD standard has been received from the power supply apparatus 120. If the predetermined information based on the communication protocol of the USB PD standard is not correctly received or if communication is not received within a predetermined period, the PD communication unit 103 will determine that the connected power supply apparatus 120 does not conform to the USB PD standard. The predetermined information in this case is information related to power that can be supplied from the power supply apparatus 120. In the first embodiment, for example, the power supply apparatus 120 is capable of supplying 0.5 W (5 V, 100 mA), 15 W (5 V, 3 A), or 20 W (20 V, 1 A) of power to the power receiving apparatus 100. Hence, the predetermined information is, for example, information indicating 0.5 W (5 V, 100 mA), 15 W (5 V, 3 A), or 20 W (20 V, 1 A). In addition, the predetermined period suffices to a period specified in the USB PD standard and can be, for example, 310 ms. However, the predetermined period is not limited to this.

If the PD communication unit 103 determines that the power supply apparatus 120 does not conform to the USB PD standard (NO in step S302), the PD communication unit 103 proceeds to step S309. In step S309, the PD communication unit 103 stops the communication process. In this case, the PD communication unit 103 may control the power receiving unit 104 such that the power receiving unit can be supplied power conforming to the USB Type-C standard.

If the PD communication unit 103 determines that the power supply apparatus 120 conforms to the USB PD standard (YES in step S302), the PD communication unit 103 proceeds to step S303. In step S303, the PD communication unit 103 makes a request, by transmitting/receiving information based on the communication protocol of the USB PD standard, to the power supply apparatus 120 to supply first power. The first power is power that falls within a range specified by a USB standard. The first power is equal to or more than minimum power necessary for the power receiving apparatus 100 to execute processes of an authentication operation in steps S305 and S306, and may be set to be power equal to a minimum value of power that can be supplied from the power supply apparatus 120. The first power is selected from the types of power that can be supplied from the power supply apparatus 120 included in the predetermined information described above. A case in which the PD communication unit 103 requests, for example, 0.5 W (5 V, 100 mA) as the first power will be described here.

Next, the PD communication unit 103 proceeds to step S304. In step S304, the power receiving unit 104 performs control, under the control of the PD communication unit 103, so that power supplied from the power supply apparatus 120 will be equal to or less than the first power. A case in which control is performed to set a current to be supplied from the power supply apparatus 120 to be 100 mA or less (however, equal to or more than a current value at least necessary for the power receiving apparatus 100 to perform the processes of the authentication operation in steps S305 and S306) will be exemplified here. The power receiving unit 104 uses power supplied from the power supply apparatus 120 to supply power to each component of the power receiving apparatus 100 so that the authentication processes of steps S305 and S306 can be performed. In this stage, since it suffices for the authentication processes of step S305 and S306 to be performed, it may be set so that the operation of the load unit 105 will be limited to suppress the power consumption of the load unit 105.

Next, the PD communication unit 103 proceeds to step S305. In step S305, the PD communication unit 103 transmits/receives authentication information based on the communication protocol of the USB PD standard. For example, the power receiving apparatus 100 transmits a request to the power supply apparatus 120 to authenticate whether the power supply apparatus 120 conforms to the USB PD standard.

Next, in step S306, the PD communication unit 103 determines whether the power supply apparatus 120 conforms to the USB PD standard. For example, the PD communication unit 103 determines whether the connected power supply apparatus 120 conforms to the USB PD standard based on whether predetermined authentication information based on the communication protocol of the USB PD standard has been received from the power supply apparatus 120. In this manner, the PD communication unit 103 can function as a determination unit that determines whether the power supply apparatus 120 is an authentic apparatus. The reliability of the determination is higher in the case of the determination based on the authentication processes of steps S305 and S306 than the case of the determination based on the negotiation communication performed in step S302. This is because a power supply apparatus that can successfully perform negotiation communication but fails to be authenticated can be present.

If predetermined authentication information based on the communication protocol of the USB PD standard is not correctly received or if communication is not received within a predetermined period, the PD communication unit 103 will make a determination in the following manner. That is, the PD communication unit 103 will determine that the connected power supply apparatus 120 does not conform to the USB PD standard. The predetermined period suffices to be a period specified by the USB PD standard and may be, for example, 4.5 sec. However, the predetermined period is not limited to this.

If the PD communication unit 103 determines that the power supply apparatus 120 does not conform to the USB PD standard (NO in step S306), the PD communication unit 103 proceeds to step S309. In step S309, the PD communication unit 103 stops the communication process. In a case in which the PD communication unit 103 proceeds from step S306 to step S309, it may be set so that the PD communication unit 103 will not perform control on the power receiving unit 104 and power receiving apparatus 100 will continue to receive the first power, set in step S304, from the power supply apparatus 120.

If the PD communication unit 103 determines that the power supply apparatus 120 conforms to the USB PD standard (YES in step S306), the PD communication unit 103 proceeds to step S307. In step S307, the PD communication unit 103 transmits/receives information based on the communication protocol of the USB PD standard. For example, the PD communication unit transmits a request to the power supply apparatus 120 to supply second power. The second power is power that falls within a range specified by a USB standard. The second power can be, for example, power higher than the first power and can be power required, for example, to cause the overall power receiving apparatus 100 to operate. The second power is selected from the information of power that can be supplied which is included in the predetermined information described above. A case in which, for example, 20 W (20 V, 1 A) is selected as the second power will be exemplified here.

Next, the PD communication unit 103 proceeds to step S308. In step S308, the power receiving unit 104 performs control, under the control of the PD communication unit 103, so that power received from the power supply apparatus 120 will be equal to or lower than the second power. A case in which control is performed to set the current value to be received from the power supply apparatus 120 to 1A or less will be exemplified here. The power receiving unit 104 also uses power supplied from the power supply apparatus 120 to supply power to each component of the power receiving apparatus 100 so that it will be possible to cause the overall power receiving apparatus 100 to operate. In a case in which the operation of the load unit 105 has been limited in step S304 so as to suppress the power consumption of the load unit 105, it may be set so that the limitation will be canceled in step S308. The processes shown in FIG. 3 is completed in this manner.

An example of the operation of the power receiving apparatus 100 according to the first embodiment will be described next with reference to the timing charts of FIGS. 4A and 4B. FIG. 4A is a timing chart for illustrating a comparison example which is to be compared with a timing chart shown in FIG. 4B. FIG. 4B is a timing chart for illustrating an example of the operation of the power receiving apparatus 100. A case in which the power receiving apparatus 100 receives power from the power supply apparatus 120 under a control operation as shown in FIG. 3 will be described with reference to the timing charts of FIGS. 4A and 4B.

In FIGS. 4A and 4B, the voltage of the CC terminal is a voltage to be applied to the CC terminal of the connector 101. In a state in which the power receiving apparatus 100 is connected to the power supply apparatus 120 via the USB cable, the voltage of the CC terminal is 2.45 V. On the other hand, in a state in which the power receiving apparatus 100 is disconnected from the power supply apparatus 120, the voltage of the CC terminal is 0 V. The voltage values of the CC terminal need only conform to the USB Type-C standard and is not limited to the voltage values shown in FIGS. 4A and 4B. A timing T401 is the timing at which the USB cable is connected to the connector 101, and corresponds to the timing at which the process shown in step S301 of FIG. 3 starts. Communications 401 to 414 are performed between the power receiving apparatus 100 and the power supply apparatus 120 via the CC terminal.

FIG. 4A is a timing chart for illustrating a comparison example as described above. The communications 401, 402, 403, and 404 indicate negotiation communications specified by the USB PD standard. The communications 405 and 406 indicate communications for authentication specified by the USB PD standard.

In the communication 401, the power receiving apparatus 100 receives, from the power supply apparatus 120, information related to power that can be supplied. The communication 401 corresponds to the processes shown in steps S301 and S302 of FIG. 3. Assume that, for example, 0.5 W (5 V, 100 mA), 15 W (5 V, 3 A), and 20 W (20 V, 1 A) are the pieces of information related to the power that can be supplied which is received by the power receiving apparatus 100 from the power supply apparatus 120 in the communication 401.

In the communication 402, the power receiving apparatus 100 makes a power supply request to the power supply apparatus 120. A case in which the power receiving apparatus 100 requests the power supply apparatus 120 to supply, for example, power of 20 W (20 V, 1 A) will be exemplified here.

In the communication 403, the power receiving apparatus 100 receives, from the power supply apparatus 120, information indicating that the power supply apparatus 120 has accepted the request from the power receiving apparatus 100. After the communication 403 has been completed, the power supply apparatus 120 changes the power that can be supplied to the VBUS terminal in accordance with the contents of the communication 402.

A timing T402 is a timing at which the power supply apparatus 120 completes the process for changing the power that can be supplied to the VBUS terminal.

In the communication 404, the power receiving apparatus 100 receives, from the power supply apparatus 120, information indicating that the power supply apparatus 120 has completed the process for changing the power that can be supplied to the VBUS terminal. The communication 404 is performed after the timing T402. Note that in the USB PD standard, it is specified that communications for authentication will be able to be performed after the communication 404.

In the communication 405, the power receiving apparatus 100 transmits, to the power supply apparatus 120, an authentication request as to whether the power supply apparatus 120 conforms to the USB PD standard. In the communication 406, the power receiving apparatus 100 receives the predetermined authentication information from the power supply apparatus 120. If the power supply apparatus 120 conforms to the USB PD standard, the communication 406 is performed. If the power supply apparatus 120 does not conform to the USB PD standard, the communication 406 is not performed.

A timing T403 is a timing at which the power receiving apparatus 100 determines whether the power supply apparatus 120 conforms to the USB PD standard based on the result of the communications for authentication including the communication 405 and the communication 406.

In this manner, in the control operation shown in FIG. 4A, the power receiving apparatus 100 can receive large amount of power from the power supply apparatus 120 in the timings T402 and T403 before the authentication process of the power supply apparatus 120 is performed. That is, a state in which the power receiving apparatus is supplied a high power from a power supply apparatus whose authentication has failed can occur problematically.

Figure 3:
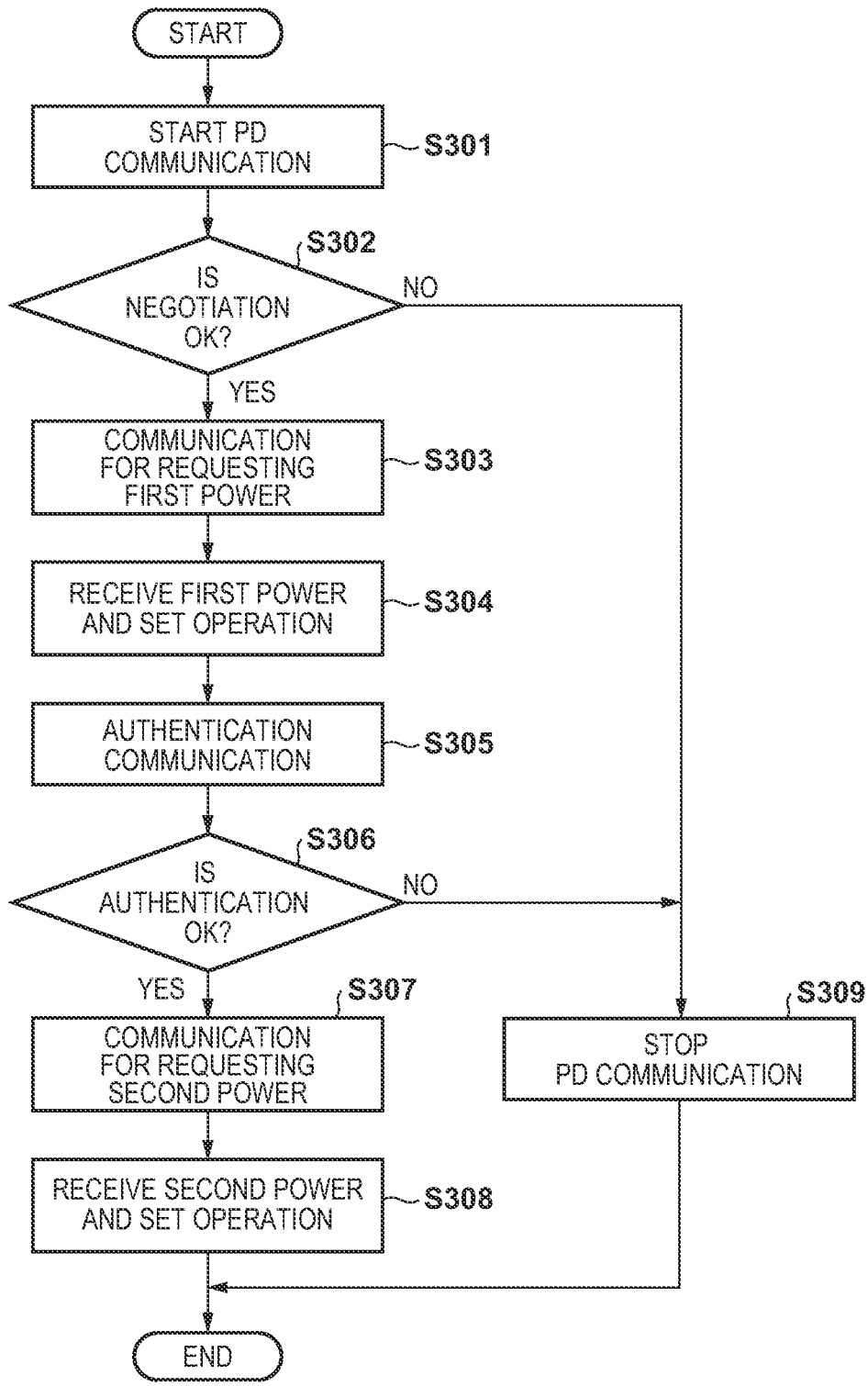
FIG. 3 is a flowchart for illustrating an example of an operation of the power receiving apparatus 100 according to the first embodiment.
Figure 4B:
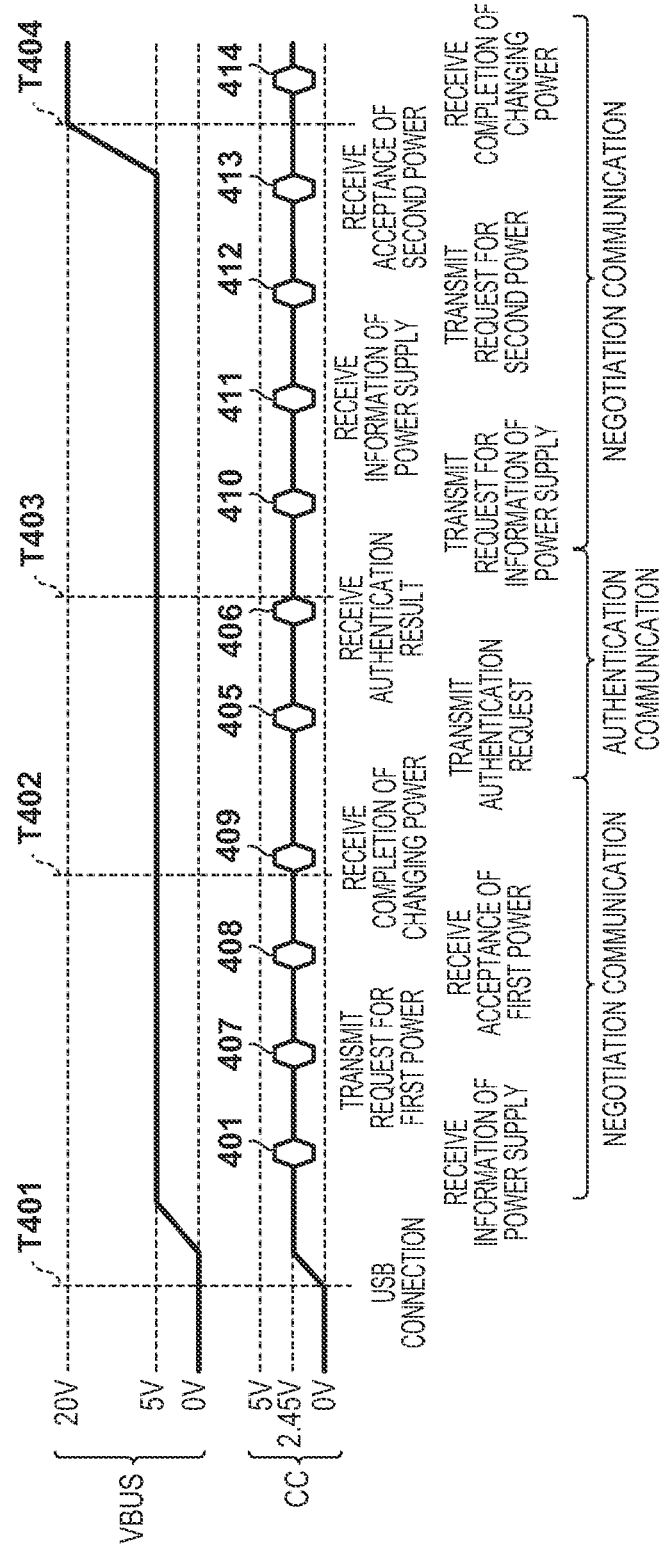
FIG. 4B is a timing chart for illustrating an example of the operation of the power receiving apparatus 100 according to the first embodiment.

FIG. 4B is a timing chart corresponding to the first embodiment as described above, and corresponds to an operation performed in a case in which the power receiving apparatus 100 is to receive power from the power supply apparatus 120 under a control operation as that shown in FIG. 3. The communications 401, 407, 408, and 409 indicate negotiation communications specified in the USB PD standard, and the power receiving apparatus 100 will request the power supply apparatus 120 to supply the first power in this communication period. The communications 405 and 406 indicate communications for authentication specified by the USB PD standard. The communications 410, 411, 412, 413, and 414 indicate negotiation communications specified by the USB PD standard, and the power receiving apparatus 100 will request the power supply apparatus 120 to supply the second power in this communication period.

The communication 401 is the same as the communication 401 described above with reference to FIG. 4A. In the communication 401, the power receiving apparatus 100 receives, from the power supply apparatus 120, information related to the power that can be supplied. As described above, the communication 401 corresponds to the processes shown in steps S301 and S302 of FIG. 3. If the communication 401 is not received correctly or if the communication 401 is not received within a predetermined time, the power receiving apparatus 100 will determine that the connected power supply apparatus 120 does not conform to the USB PD standard.

In the communication 407, the power receiving apparatus 100 requests the power supply apparatus 120 to supply the first power. The communication 407 corresponds to the process shown in step S303 of FIG. 3. A case in which the first power is 0.5 W (5 V, 100 mA) will be exemplified here.

In the communication 408, the power receiving apparatus 100 receives, from the power supply apparatus 120, information indicating that the power supply apparatus 120 has accepted the request for supplying the first power. After the communication 408 has been completed, the power supply apparatus 120 changes the power that can be supplied to the VBUS terminal in accordance with the contents of the communication 407.

The timing T402 is the same as the timing T402 shown in FIG. 4A and is a timing at which the power supply apparatus 120 completes the process for changing the power that can be supplied to the VBUS terminal. However, in the operation shown in FIG. 4B, the power that the power receiving apparatus 100 can receive from the power supply apparatus 120 at the timing T402 is set to be minimum power necessary for the power receiving apparatus 100 to perform the operation of the communications for authentication in step S305.

In the communication 409, the power receiving apparatus 100 receives, from the power supply apparatus 120, information indicating that the power supply apparatus 120 has completed the process for changing the power that can be supplied to the VBUS terminal. The communication 409 is performed after the timing T402. Note that in the USB PD standard, it is specified that communications for authentication will be able to be performed after the communication 409.

The communications 405 and 406 are the same as the communications 405 and 406 described above with reference to FIG. 4A. The communications 405 and 406 correspond to the processes of steps S305 and S306 shown in FIG. 3. The power receiving apparatus 100 determines that the power supply apparatus 120 conforms to the USB PD standard by receiving the communication 406.

The timing T403 is the same as the timing T403 shown in FIG. 4A. Based on the result of the communications for authentication including the communications 405 and 406, the power receiving apparatus 100 determines whether the power supply apparatus 120 conforms to the USB PD standard. A case in which the power supply apparatus 120 conforms to the USB PD standard will be exemplified here.

In the communication 410, the power receiving apparatus 100 transmits a request to power supply apparatus 120 to provide information related to the power that can be supplied.

In the communication 411, the power receiving apparatus 100 receives, from the power supply apparatus 120, the information related to the power that can be supplied. Assume that, for example, 0.5 W (5 V, 100 mA), 15 W (5 V, 3 A), and 20 W (20 V, 1 A) are the pieces of information related to the power that can be supplied which the power receiving apparatus 100 receives from the power supply apparatus 120 in the communication 411.

In the communication 412, the power receiving apparatus 100 transmits, to the power supply apparatus 120, a request for supplying the second power. The communication 410, the communication 411, and the communication 412 correspond to the process of step S307 shown in FIG. 3. A case in which the second power is, for example, 20 W (20 V, 1 A) will be exemplified here.

In communication 413, the power receiving apparatus 100 receives, from the power supply apparatus 120, information that the power supply apparatus 120 has accepted to supply the second power. After the communication 413 has been performed, the power supply apparatus 120 changes the power that can be supplied to the VBUS terminal in accordance with the contents of the communication 412.

A timing T404 is a timing at which the power supply apparatus 120 completes the process for changing the power that can be supplied to the VBUS terminal. As shown in FIG. 4B, in the operation according to the first embodiment, the timing T404 is the timing at which the power receiving apparatus 100 can receive the supply of the second power which is higher than the first power from the power supply apparatus 120.

In the communication 414, the power receiving apparatus 100 receives, from the power supply apparatus 120, information indicating that the power supply apparatus 120 has completed the process for changing the power that can be supplied to the VBUS terminal. The communication 414 is performed after the timing T404. After the communication 414 has been completed, the power receiving apparatus 100 performs the process of step S308 in FIG. 3.

In this manner, in the first embodiment, in a period until the timing T403 at which the authentication result of the power supply apparatus 120 becomes clear, the power requested to the power supply apparatus 120 is set to the first power which is the minimum power necessary to execute the authentication process. Subsequently, it is set so that, after the timing T403 at which the authentication result of the power supply apparatus 120 becomes clear and if the authentication is successful, a request for supplying the second power which is higher than the first power will be made to the power supply apparatus 120.

In this manner, according to the first embodiment, the PD communication unit 103 determines whether the power supply apparatus 120 is an authentic apparatus after the PD communication unit 103 has made a request to the power supply apparatus 120 to supply the first power. If the PD communication unit 103 determines that the power supply apparatus 120 is an authentic apparatus, the PD communication unit 103 will make a request to the power supply apparatus 120 to supply the second power which is higher than the first power. The PD communication unit 103 will not make a request to the power supply apparatus 120 to supply the second power until the PD communication unit 103 determines that the power supply apparatus 120 is authentic. Hence, according to the first embodiment, it is possible to ensure the safety of power receiving and supply.

<2. Power Supply Apparatus>

Figure 5:
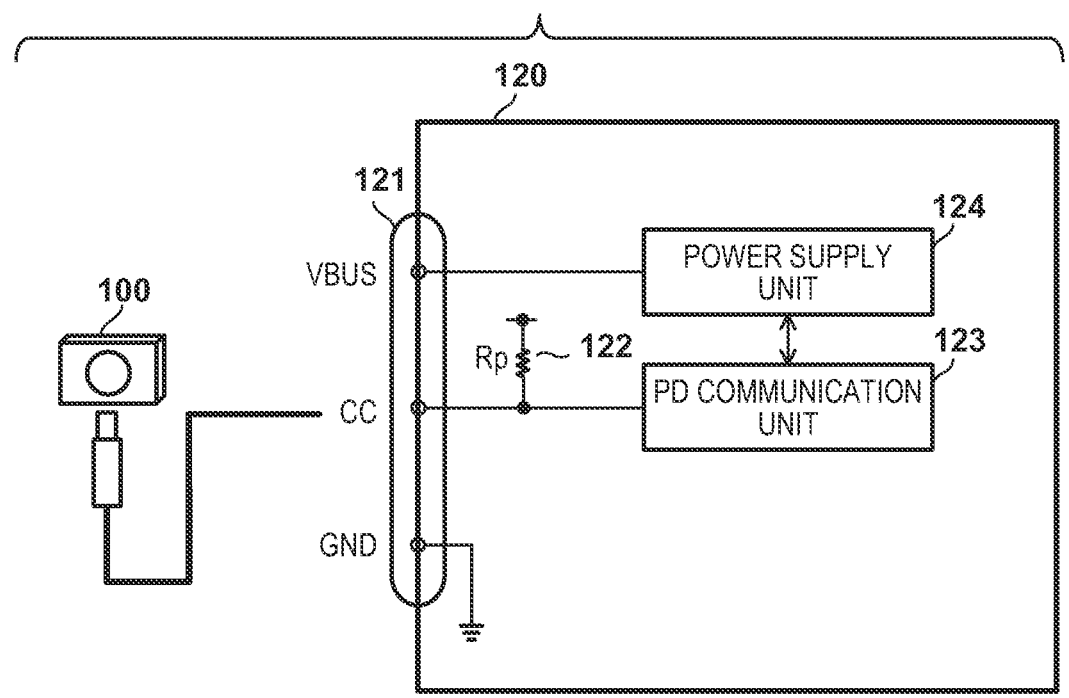
FIG. 5 is a block diagram for illustrating the arrangement of a power supply apparatus 120 according to the first embodiment.

The arrangement of the power supply apparatus 120 according to the first embodiment will be described next with reference to FIG. 5. FIG. 5 is a block diagram for illustrating the arrangement of the power supply apparatus 120 according to the first embodiment.

As shown in FIG. 5, the power supply apparatus 120 includes a connector 121, a pull-up resistor (Rp) 122, a PD communication unit 123, and a power supply unit 124. However, components of the power supply apparatus 120 are not limited to these.

Figure 2B:
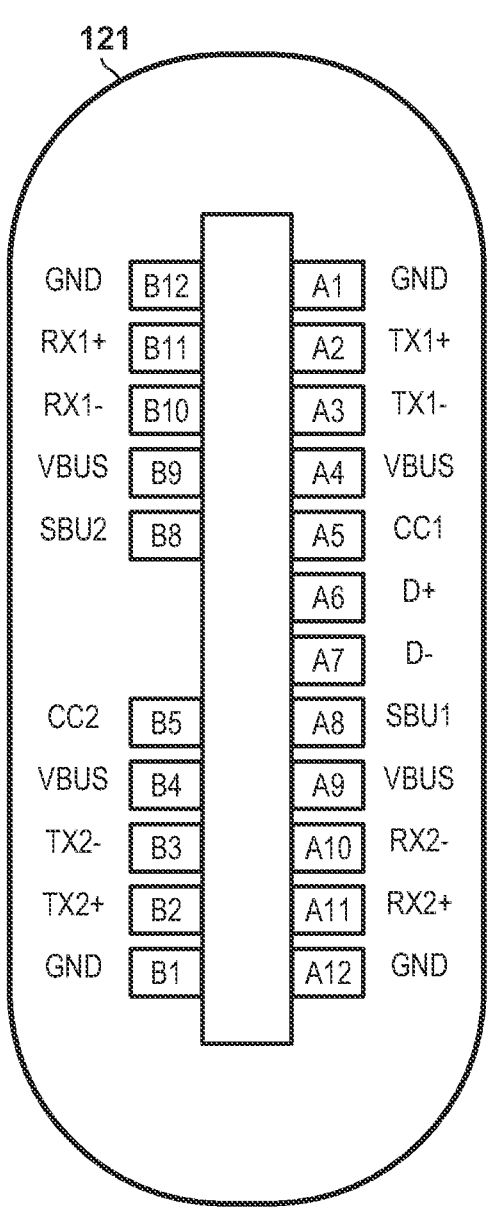
FIG. 2B is a view for illustrating a pin assignment of a connector 121.

The connector 121 is a receptacle conforming to the USB Type-C standard. The connector 121 is connected to a connector (plug) conforming to the USB Type-C standard included in a USB cable for supplying power to the power receiving apparatus 100. The connector 121 has a pin assignment as shown in FIG. 2B. The connector 121 includes VBUS terminals for supplying power to the power receiving apparatus 100 and CC terminals for informing information related to the power supply capability to the power receiving apparatus 100. The connector 121 also includes GND terminals or the like that serve as signal references. TX terminals (TX1+, TX1−, TX2+, and TX2−) are signal transmitting terminals and RX terminals (RX1+, RX1−, RX2+, and RX2−) are signal receiving terminals, and these terminals can support high-speed data transfer operations. SBU terminals (SBU1 and SBU2) are sideband signal terminals and can be used appropriately for various kinds of purposes. A D+ terminal and a D− terminal are used to support the USB 2.0 standard.

One end of the pull-up resistor 122 is connected to the CC terminal of the connector 121. The other end of the pull-up resistor 122 is connected to a predetermined power supply. The pull-up resistor 122 has a resistance value specified by the USB Type-C standard. The pull-up resistor 122 allows the power supply apparatus 120 to determine the connection of the power receiving apparatus 100. The pull-up resistor 122 also allows the power supply apparatus 120 to inform the power supply capability to the power receiving apparatus 100. The predetermined power source can be any power source that satisfies the conditions specified by the USB Type-C standard. For example, a constant voltage power source of 5 V can be used as the predetermined power source.

The PD communication unit 123 is connected to the CC terminal of the connector 121. The PD communication unit 123 can execute communication based on the USB PD standard as well as determine whether the connected p power receiving apparatus 100 conforms to the USB PD standard.

In a case in which the power receiving apparatus 100 is capable of executing USB PD communication, the power supply apparatus 120 performs, by the PD communication unit 123, negotiation communication based on a communication protocol specified by the USB PD standard, and transmits information indicating the power that can be supplied to the power receiving apparatus 100. The power supply apparatus 120 also performs, by the PD communication unit 123, communications for authentication based the communication protocol specified by the USB PD standard, and performs, to the power receiving apparatus 100, communications for authentication to indicate that the power supply apparatus 120 conforms to the USB PD standard. Note that the fact that the power receiving apparatus 100 is an authentic apparatus is synonymous with the fact that the power receiving apparatus 100 is an apparatus conforming to the USB PD standard. In the first embodiment, assume that there are at least two types of power that can be supplied from the power supply apparatus 120 to the power receiving apparatus 100. One of the plurality of types of power that can be supplied is low power set considering the safety of the power receiving apparatus 100. The low power can be, for example, the minimum power specified by USB standards. In this manner, the PD communication unit 123 can function as a informing unit that informs, to the power receiving apparatus 100, information indicating the power that can be supplied.

The power supply unit 124 is connected to the VBUS terminal of the connector 121. The power supply unit 124 supplies power to the power receiving apparatus 100 via the VBUS terminal of the connector 121. The power supply unit 124 controls power supplied to the power receiving apparatus 100 based on an instruction from the PD communication unit 123. In this manner, the power supply unit 124 can function as a power supply unit that supplies power to the power receiving apparatus 100.

Figure 6:
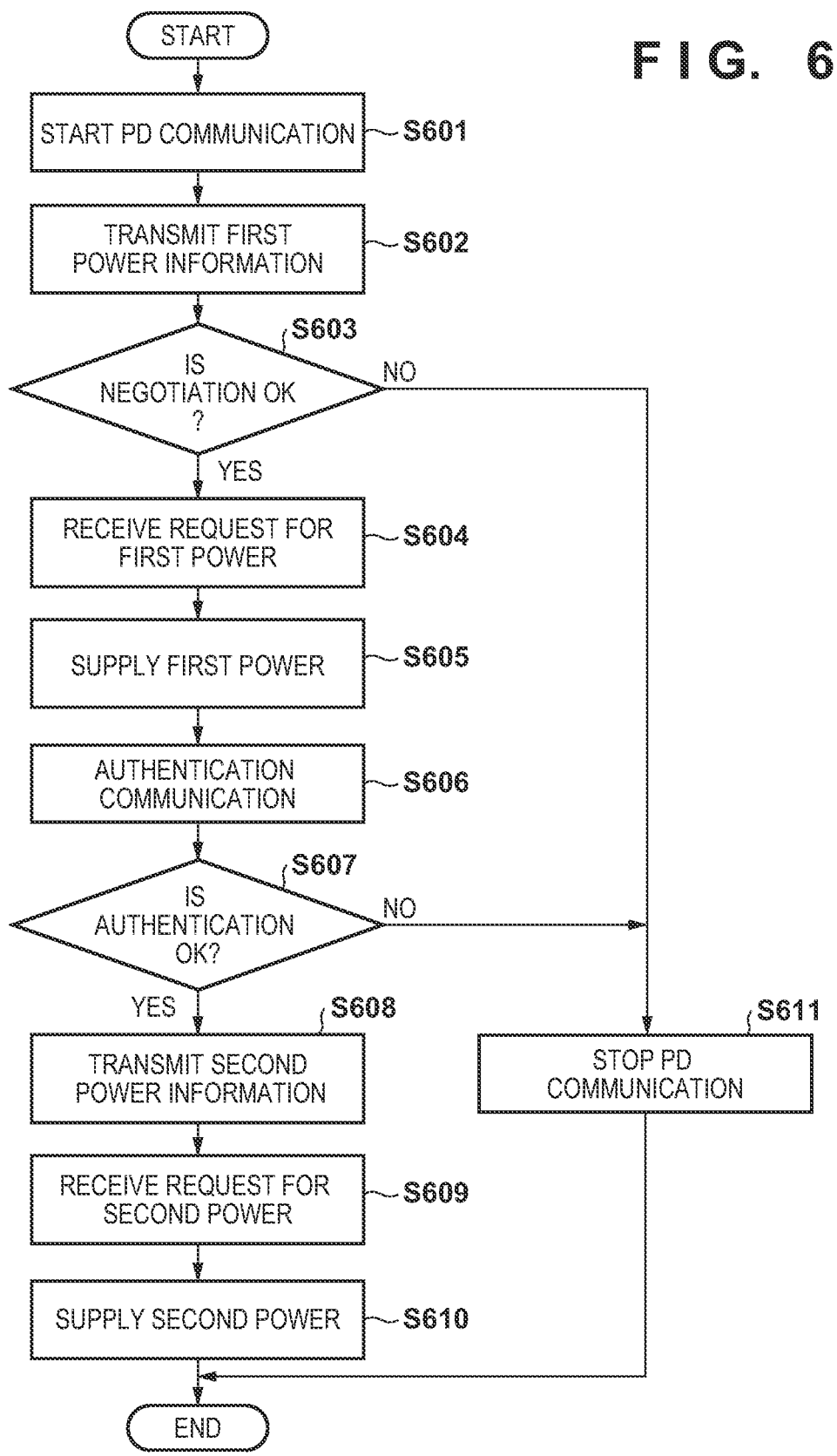
FIG. 6 is a flowchart for illustrating an example of an operation of the power supply apparatus 120 according to the first embodiment.

An example of the operation of the power supply apparatus 120 according to the first embodiment will be described next with reference to the flowchart of FIG. 6.

When the power receiving apparatus 100 is connected to the connector 121 of the power supply apparatus 120 via the USB cable, the PD communication unit 123 starts, in step S601, to transmit/receive information with the power receiving apparatus 100 based on a communication protocol of the USB PD standard.

In step S602, the PD communication unit 123 transmits information indicating the first power as information indicating the power that can be supplied. The first power is low power set in consideration of the safety of the power receiving apparatus 100. For example, the first power is the lowest power among the types of power specified by the USB PD standard. A case in which the first power is 0.5 W (5 V, 100 mA) will be exemplified here.

In step S603, the PD communication unit 123 determines, based on predetermined negotiation communication, whether the power receiving apparatus 100 conforms to the USB PD standard. For example, the PD communication unit 123 determines whether the connected power receiving apparatus 100 conforms to the USB PD standard in accordance with whether the power receiving apparatus 100 has replied by transmitting predetermined information based on the communication protocol of the USB PD standard. If the power supply apparatus 120 does not receive a reply from the power receiving apparatus 100 to the information transmitted in step S602, the PD communication unit 123 will determine that the connected power receiving apparatus 100 does not conform to the USB PD standard. In this manner, the PD communication unit 123 can function as a determination unit that determines whether the power receiving apparatus 100 is an authentic apparatus.

If the PD communication unit 123 determines that the power receiving apparatus 100 does not conform to the USB PD standard (NO in step S603), the PD communication unit 123 proceeds to step S611. In step S611, the PD communication unit 123 stops the communication process. In this case, it may be arranged so that the PD communication unit 123 will control the power supply unit 124 to supply power conforming to the USB Type-C standard to the power receiving apparatus 100. In addition, it may be arranged so that the PD communication unit 123 will control the power supply unit 124 to stop supplying the power to the power receiving apparatus 100.

If the PD communication unit 123 determines that the power receiving apparatus 100 conforms to the USB PD standard (YES in step S603), the PD communication unit 123 proceeds to step S604. In step S604, the PD communication unit 123 receives a request for supplying the first power from the power receiving apparatus 100 by the transmission/reception of information based on the communication protocol of the USB PD standard. As described above, a case in which the first power is 0.5 W (5 V, 100 mA) will be exemplified here.

Next, the PD communication unit 123 proceeds to step S605. In step S605, the power supply unit 124 starts supplying the first power to the power receiving apparatus 100 based on an instruction form the PD communication unit 123. A case in which the power supply unit 124 performs control so that the voltage supplied to the power receiving apparatus 100 will be 5 V and the current supplied to the power receiving apparatus 100 will be equal to or less than 100 mA will be exemplified here.

Next, the PD communication unit 123 proceeds to step S606. In step S606, the PD communication unit 123 transmits/receives information based on the communication protocol of the USB PD standard. For example, the power supply apparatus 120 makes a request, to the power receiving apparatus 100, for authentication as to whether the power receiving apparatus 100 conforms to the USB PD standard.

Next, in step S607, the PD communication unit 123 determines whether the power receiving apparatus 100 conforms to the USB PD standard. For example, the PD communication unit 123 will determine whether the power receiving apparatus 100 conforms to the USB PD standard based on whether predetermined authentication information based on the communication protocol of the USB PD standard has been received from the power receiving apparatus 100.

If the predetermined authentication information based on the communication protocol of the USB PD standard is not received correctly or if the authentication information is not received within a predetermined period, the PD communication unit 123 makes a determination in the following manner. That is, the PD communication unit 123 determines that the connected power receiving apparatus 100 does not conform to the USB PD standard. The predetermined period suffices to be a period specified by the USB PD standard, and can be, for example, a period of 4.5 sec. However, the predetermined period is not limited to this.

If the PD communication unit 123 determines that the power receiving apparatus 100 does not conform to the USB PD standard (NO in step S607), the PD communication unit 123 proceeds to step S611. In step S611, the PD communication unit 123 stops the communication process. If the PD communication unit 123 proceeds from step S607 to step S611, it may be arranged so that the PD communication unit 123 will continue supplying the first power to the power receiving apparatus 100 which was set in step S605 without controlling the power supply unit 124.

If the PD communication unit 123 determines that the power receiving apparatus 100 conforms to the USB PD standard (YES in step S607), the PD communication unit 123 proceeds to step S608. In step S608, the PD communication unit 123 transmits/receives information based on the communication protocol of the USB PD standard. For example, the power supply apparatus 120 transmits, to the power receiving apparatus 100, information indicating the second power that can be supplied. Information indicating the second power that can be supplied includes information of power higher than the first power. A case in which the second power that can be supplied is 15 W (5 V, 3 A) and 20 W (20 V, 1 A) will be exemplified here.

Next, the PD communication unit 123 proceeds to step S609. In step S609, the PD communication unit 123 transmits/receives information based on the communication protocol of the USB PD standard. For example, the PD communication unit 123 receives, from the power receiving apparatus 100, communication requesting the supply of the second power. The second power requested by the power receiving apparatus 100 is selected from the pieces of information indicating the second power informed in step S608. A case in which 20 W (20 V, 1 A) is selected as the second power will be exemplified here.

Next, the PD communication unit 123 proceeds to step S610. In step S610, the power supply unit 124 starts supplying the second power to the power receiving apparatus 100 based on an instruction from the PD communication unit 123. A case in which the power supply unit 124 performs control so that the voltage supplied to the power receiving apparatus 100 will be 20 V and the current supplied to the power receiving apparatus 100 will be equal to or less than 1 A will be exemplified here.

Examples of the operation of the power supply apparatus 120 according to the first embodiment will be described next with reference to the timing charts of FIGS. 7A and 7B. FIG. 7A shows an example of the operation performed in a case in which the power receiving apparatus 100 does not conform to the USB PD standard. FIG. 7B shows an example of the operation performed in a case in which the power receiving apparatus 100 conforms to the USB PD standard.

In FIGS. 7A and 7B, the voltage of the CC terminal is the voltage value applied to the CC terminal of the connector 121. In a state in which the power receiving apparatus 100 is connected to the power supply apparatus 120 via the USB cable, the voltage of the CC terminal is 2.45 V. On the other hand, in a state in which the power receiving apparatus 100 is disconnected from the power supply apparatus 120, the voltage of the CC terminal is 5 V. The voltage value of the CC terminal suffices to be a voltage value that conforms to the USB Type-C standard and is not limited to the voltage values shown in FIGS. 7A and 7B. A timing T701 corresponds to a timing at which the USB cable is connected to the connector 121 and the process shown in step S601 of FIG. 6 starts. Communications 701 to 710 are performed between the power receiving apparatus 100 and the power supply apparatus 120 via the CC terminal. Communications 701, 702, 703, and 704 are negotiation communications specified by the USB PD standard, and the first power is informed in this communication period. Communications 705 and 706 are communications for authentication specified by the USB PD standard. In addition, communications 707, 708, 709, and 710 are negotiation communications specified by the USB PD standard, and the second power is informed in this communication period.

First, the operation performed in a case in which the power receiving apparatus 100 does not conform to the USB PD standard will be described with reference to FIG. 7A. In the communication 701, the power supply apparatus 120 transmits, to the power receiving apparatus 100, information related to the first power that can be supplied. The communication 701 corresponds to the process shown in step S602 of FIG. 6. The information that is to be transmitted in the communication 701 includes, for example, only 0.5 W (5 V, 100 mA) as the first power that can be supplied. If the power supply apparatus 120 does not receive a reply from the power receiving apparatus 100, the power supply apparatus 120 will determine that the power receiving apparatus 100 does not conform to the USB PD standard.

In the communication 702, the power supply apparatus 120 receives a request from the power receiving apparatus 100 to supply the first power. The communication 702 corresponds to the process shown in step S604 of FIG. 6. A case in which the power supply apparatus 120 receives a request for supplying power of 0.5 W (5 V, 100 mA) from the power receiving apparatus 100 will be exemplified here.

In the communication 703, the power supply apparatus 120 transmits, to the power receiving apparatus 100, information indicating that the power supply apparatus 120 has accepted the request for supplying the first power. After the communication 703 has been performed, the power supply apparatus 120 changes the power that can be supplied to the VBUS terminal in accordance with the contents of the communication 702.

A timing T702 is a timing at which the power supply apparatus 120 completes the process for changing the power that can be supplied to the VBUS terminal. The power supplied from the power supply apparatus 120 to the power receiving apparatus 100 at the point of the timing T702 is low power set considering the safety of the power receiving apparatus 100.

In the communication 704, the power supply apparatus 120 transmits, to the power receiving apparatus 100, information indicating that the power supply apparatus 120 has completed the process for changing the power that can be supplied to the VBUS terminal. The communication 704 is performed after the timing T702. Note that the communications 703 and 704 correspond to the process shown in step S605 of FIG. 6. Note that in the USB PD standard, it is specified that communications for authentication will be able to be performed after the communication 702.

In the communication 705, the power supply apparatus 120 transmits, to the power receiving apparatus 100, an authentication request as to whether the power receiving apparatus 100 conforms to the USB PD standard. Note that the communication 705 corresponds to the process shown in step S606 of FIG. 6. In a case in which the power receiving apparatus 100 does not conform to the USB PD standard, the power supply apparatus 120 does not receive an authentication result from the power receiving apparatus 100 as shown in FIG. 7A. A timing T703 is a timing at which the power supply apparatus 120 determines that the power receiving apparatus 100 does not conform to the USB PD standard. After the timing T703, the power supply apparatus 120 stops the communication with the power receiving apparatus 100 as shown in step S611 of FIG. 6. Subsequently, the power supply apparatus 120 will continue to supply, to the power receiving apparatus 100, the power determined in the negotiation communications of the communications 701 to 704.

The operation performed in a case in which the power receiving apparatus 100 conforms to the USB PD standard will be described with reference to FIG. 7B.

First, the processes of communications 701 to 705 are the same as those of the communications 701 to 705 described above with reference to FIG. 7A, and thus a description will be omitted.

In the communication 706, the power supply apparatus 120 receives, from the power receiving apparatus 100, an authentication result indicating that the power receiving apparatus 100 conforms to the USB PD standard. The communications 705 and 706 corresponds to the processes shown in steps S606 and S607 of FIG. 6. As shown in step S607 of FIG. 6, the power supply apparatus 120 will determine that the power receiving apparatus 100 conforms to the USB PD standard if the communication 706 is received.

A timing T704 is a timing at which the power supply apparatus 120 determines that the power receiving apparatus 100 conforms to the USB PD standard based on the result of the communications for authentication including the communication 705 and the communication 706.

In the communication 707, the power supply apparatus 120 transmits, to the power receiving apparatus 100, information indicating the second power that can be supplied. The communication 707 corresponds to the process shown in step S608 of FIG. 6. The information indicating the second power that can be supplied includes information indicating power higher than the first power which was informed in the communication 701. Information indicating the second power that can be supplied is, for example, 15 W (5 V, 3 A) and 20 W (20 V, 1 A)

In the communication 708, the power supply apparatus 120 receives, from the power receiving apparatus 100, a request to supply the second power. The communication 708 corresponds to the process shown in step S609 of FIG. 6. A case in which the second power is 20 W (20 V, 1 A) will be exemplified here.

In the communication 709, the power supply apparatus 120 transmits, to the power receiving apparatus 100, information indicating that the power supply apparatus 120 has accepted to supply the second power. After the communication 709 has been performed, the power supply apparatus 120 changes the power that can be supplied to the VBUS terminal in accordance with the contents of the communication 708.

A timing T705 is a timing at which the power supply apparatus 120 completes the process for changing the power that can be supplied to the VBUS terminal. As shown in FIG. 7B, at the timing T705, the power supply apparatus 120 is able to supply the second power which is higher than the first power to the power receiving apparatus 100.

In the communication 710, the power supply apparatus 120 transmits, to the power receiving apparatus 100, information indicating that the power supply apparatus 120 has completed the process for changing the power that can be supplied to the VBUS terminal. The communication 710 is performed after the timing T705. Note that the communications 709 and 710 correspond to the process shown in step S610 of FIG. 6.

In this manner, in a period until the timing T704 at which the authentication result of the power receiving apparatus 100 is clarified, the power supply apparatus 120 supplies, to the power receiving apparatus 100, the first power which is the minimum necessary power. Subsequently, after the timing T704 at which the authentication result of the power receiving apparatus 100 is clarified, the power supply apparatus 120 supplies the second power which is higher than the first power to the power receiving apparatus 100 in accordance with the request from the power receiving apparatus 100.

In this manner, according to the first embodiment, the PD communication unit 123 determines whether the power receiving apparatus 100 is an authentic apparatus after the PD communication unit 123 informs, to the power receiving apparatus 100, information indicating the first power as the information of power that can be supplied. If the PD communication unit 123 determines that the power receiving apparatus 100 is an authentic apparatus, the PD communication unit 123 informs, to the power receiving apparatus 100, information of the power that can be supplied including the information indicating the second power higher than the first power. Information indicating that the second power can be supplied is not informed to the power receiving apparatus 100 until the PD communication unit 123 determines that the power receiving apparatus 100 is an authentic apparatus. Therefore, according to the first embodiment, it is possible to assure the safety of the power supply apparatus 120.

Second Embodiment

Various kinds of functions, processes, or methods described in the first embodiment can be implemented by a personal computer, a microcomputer, a CPU (Central Processing Unit), a processor, or the like by using corresponding programs. In the second embodiment, a personal computer, a microcomputer, a CPU (Central Processing Unit), a processor, or the like will be referred to as a "computer X" hereinafter. Also, in the second embodiment, a program for controlling the computer X, that is, a program for implementing one of the various kinds of functions, processes, or methods described in the first embodiment will be referred to as a "program Y".

Each of the various kinds of functions, processes, or methods described in the first embodiment is implemented by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory, a nonvolatile memory, or the like. The computer-readable storage medium according to the second embodiment is a non-transitory storage medium.

Note that aspects of the disclosure are not limited to the first embodiment or the second embodiment as described above. The aspects of the disclosure can include the first embodiment or the second embodiment, altered by changes or modifications, without departing from the spirit of the scope of the disclosure.

While aspects of the disclosure are described with reference to exemplary embodiments, it is to be understood that the scope of the disclosure is not limited to the exemplary embodiments. Further, the scope of the following claims is to be accorded the broadest interpretation so as to encompass all modifications and equivalent structures.

This application claims priority from Japanese Patent Application No. 2018-001867, filed on Jan. 10, 2018, which is hereby incorporated by reference herein in its entirety.

What is claimed is:

1. An electronic device comprising:

a connector that includes a first terminal used to receive power from a power supply apparatus and a second terminal used to communicate with the power supply apparatus; and a processor which executes a program to perform functions of:

a communication unit that (a) performs a first communication with the power supply apparatus via the second terminal to request the power supply apparatus to supply a first power to the first terminal, (b) performs a second communication with the power supply apparatus via the second terminal to authenticate whether the power supply apparatus is an apparatus conforming to a USB Power Delivery standard in a case where the first communication is performed with the power supply apparatus via the second terminal and the first power is requested to the power supply apparatus, and (c) performs a third communication with the power supply apparatus via the second terminal to request the power supply apparatus to supply a second power higher than the first power to the first terminal in a case where the second communication is performed with the power supply apparatus via the second terminal and the power supply apparatus is authenticated as the apparatus conforming to the USB Power Delivery standard, wherein the third communication is not performed with the power supply apparatus via the second terminal so that the second power higher than the first power is not supplied from the power supply apparatus to the first terminal, in a case where the second communication is performed with the power supply apparatus via the second terminal and the power supply apparatus is not authenticated as the apparatus conforming to the USB Power Delivery standard.

2. The electronic device according to claim 1, wherein the communication unit authenticates that the power supply apparatus is the apparatus conforming to the USB Power Delivery standard based on receiving, from the power supply apparatus, information indicating that the power supply apparatus is the apparatus conforming to the USB Power Delivery standard.

3. The electronic device according to claim 1, wherein the first power is used to perform the second communication with the power supply apparatus and authenticate whether the power supply apparatus is the apparatus conforming to the USB Power Delivery standard.

4. The electronic device according to claim 1, wherein the first communication, the second communication, and the third communication are conformed to the USB Power Delivery standard.

5. The electronic device according to claim 1, wherein the first power is 0.5 W.

6. The electronic device according to claim 1, further comprising a power receiving unit that receives the first power or the second power from the power supply apparatus via the first terminal.

7. The electronic device according to claim 1, wherein the first terminal is a VBUS terminal and the second terminal is a CC (Configuration Channel) terminal.

8. The electronic device according to claim 1, wherein the electronic device is a digital camera.

9. An electronic device comprising:
a connector that includes a first terminal used to supply power to a power receiving apparatus and a second terminal used to communicate with the power receiving apparatus; and
a processor which executes a program to perform functions of:
a communication unit that (a) performs a first communication with the power receiving apparatus via the second terminal to transmit first information indicating a first power that can be supplied to the power receiving apparatus via the first terminal, (b) performs a second communication with the power receiving apparatus via the second terminal to authenticate whether the power receiving apparatus is an apparatus conforming to a USB Power Delivery standard in a case where the first communication is performed with the power receiving apparatus via the second terminal and the first information is transmitted to the power receiving apparatus, and (c) performs a third communication with the power receiving apparatus via the second terminal to transmit second information indicating a second power higher than the first power in a case where the second communication is performed with the power receiving apparatus via the second terminal and the power receiving apparatus is authenticated as the apparatus conforming to the USB Power Delivery standard,
wherein the third communication is not performed with the power receiving apparatus via the second terminal so that the second power higher than the first power is not supplied to the power receiving apparatus via the first terminal, in a case where the second communication is performed with the power receiving apparatus via the second terminal and the power receiving apparatus is not authenticated as the apparatus conforming to the USB Power Delivery standard.

10. The electronic device according to claim 9, wherein the communication unit authenticates that the power receiving apparatus is the apparatus conforming to the USB Power Delivery standard based on receiving, from the power receiving apparatus, information that the power receiving apparatus is the apparatus conforming to the USB Power Delivery standard.

11. The electronic device according to claim 9, wherein the first power is power used to perform the second communication with the power receiving apparatus and authenticate whether the power receiving apparatus is the apparatus conforming to the USB Power Delivery standard.

12. The electronic device according to claim 9, wherein the first power is 0.5 W.

13. The electronic device according to claim 9, further comprising:
a power supply unit that supplies the first power or the second power to the power receiving apparatus via the first terminal.

14. The electronic device according to claim 9, wherein the first communication, the second communication, and the third communication are conformed to the USB Power Delivery standard.

15. The electronic device according to claim 9, wherein the first terminal is a VBUS terminal and the second terminal is a CC (Configuration Channel) terminal.

16. The electronic device according to claim 9, wherein the electronic device is a portable battery.

17. A method comprising:
performing a first communication with a power supply apparatus via a second terminal of a connector to request the power supply apparatus to supply a first power to a first terminal of the connector;
performing a second communication with the power supply apparatus via the second terminal to authenticate whether the power supply apparatus is an apparatus conforming to a USB Power Delivery standard in a case where the first communication is performed with the power supply apparatus via the second terminal and the first power is requested to the power supply apparatus; and
performing a third communication with the power supply apparatus via the second terminal to request the power supply apparatus to supply a second power higher than the first power to the first terminal in a case where the second communication is performed with the power supply apparatus via the second terminal and the power supply apparatus is authenticated as the apparatus conforming to the USB Power Delivery standard,
wherein the third communication is not performed with the power supply apparatus via the second terminal so that the second power higher than the first power is not supplied from the power supply apparatus to the first terminal, in a case where the second communication is performed with the power supply apparatus via the second terminal and the power supply apparatus is not authenticated as the apparatus conforming to the USB Power Delivery standard.

18. A method comprising:
performing a first communication with a power receiving apparatus via a second terminal of a connector to transmit first information indicating a first power that can be supplied to the power receiving apparatus via a first terminal of the connector;
performing a second communication with the power receiving apparatus via the second terminal to authenticate whether the power receiving apparatus is an apparatus conforming to a USB Power Delivery standard in a case where the first communication is performed with the power receiving apparatus via the second terminal and the first information is transmitted to the power receiving apparatus; and
performing a third communication with the power receiving apparatus via the second terminal to transmit second information indicating a second power higher than the first power in a case where the second communication is performed with the power receiving apparatus via the second terminal and the power receiving apparatus is authenticated as the apparatus conforming to the USB Power Delivery standard,
wherein the third communication is not performed with the power receiving apparatus via the second terminal so that the second power higher than the first power is not supplied to the power receiving apparatus via the first terminal, in a case where the second communication is performed with the power receiving apparatus via the second terminal and the power receiving apparatus is not authenticated as the apparatus conforming to the USB Power Delivery standard.

19. A non-transitory storage medium that stores a program causing a computer to execute a method, the method comprising:
performing a first communication with a power supply apparatus via a second terminal of a connector to request the power supply apparatus to supply a first power to a first terminal of the connector;
performing a second communication with the power supply apparatus via the second terminal to authenticate whether the power supply apparatus is an apparatus conforming to a USB Power Delivery standard in a case where the first communication is performed with the power supply apparatus via the second terminal and the first power is requested to the power supply apparatus; and performing a third communication with the power supply apparatus via the second terminal to request the power supply apparatus to supply a second power higher than the first power to the first terminal in a case where the second communication is performed with the power supply apparatus via the second terminal and the power supply apparatus is authenticated as the apparatus conforming to the USB Power Delivery standard, wherein the third communication is not performed with the power supply apparatus via the second terminal so that the second power higher than the first power is not supplied from the power supply apparatus to the first terminal, in a case where the second communication is performed with the power supply apparatus via the second terminal and the power supply apparatus is not authenticated as the apparatus conforming to the USB Power Delivery standard.

20. A non-transitory storage medium that stores a program causing a computer to execute a method, the method comprising:

performing a first communication with a power receiving apparatus via a second terminal of a connector to transmit first information indicating a first power that can be supplied to the power receiving apparatus via a first terminal of the connector;

performing a second communication with the power receiving apparatus via the second terminal to authenticate whether the power receiving apparatus is an apparatus conforming to a USB Power Delivery standard in a case where the first communication is performed with the power receiving apparatus via the second terminal and the first information is transmitted to the power receiving apparatus; and performing a third communication with the power receiving apparatus via the second terminal to transmit second information indicating a second power higher than the first power in a case where the second communication is performed with the power receiving apparatus via the second terminal and the power receiving apparatus is authenticated as the apparatus conforming to the USB Power Delivery standard, wherein the third communication is not performed with the power receiving apparatus via the second terminal so that the second power higher than the first power is not supplied to the power receiving apparatus via the first terminal, in a case where the second communication is performed with the power receiving apparatus via the second terminal and the power receiving apparatus is not authenticated as the apparatus conforming to the USB Power Delivery standard.

* * * * *